UNITED STATES PATENT OFFICE.

MAX SCHÜTZ, OF FORT LEE, NEW JERSEY.

COMPOUND FOR PRESERVING THE SOLES OF BOOTS AND SHOES.

SPECIFICATION forming part of Letters Patent No. 292,956, dated February 5, 1884.

Application filed August 21, 1883. (No specimens.)

*To all whom it may concern:*

Be it known that I, MAX SCHÜTZ, of Fort Lee, in the county of Bergen and State of New Jersey, have invented certain new and useful Improvements in Compounds for Preserving the Soles of Boots and Shoes, of which the following is a specification.

This invention has reference to an improved composition for preserving and waterproofing the soles of boots and shoes so as to render them more durable and impervious to moisture; and the invention consists of alcohol, shellac, and linseed-oil, mixed together in certain proportions, as will be shown hereinafter.

In preparing my invention twenty-five parts, by weight, of shellac are first dissolved in twenty-five parts of alcohol, which solution is then thoroughly mixed with fifty parts of boiled linseed-oil. This compound is colored in any suitable manner to the color of new leather, and is applied externally to the soles of boots and shoes, and other articles. It can be applied to new soles or to soles that have been in use for some time. The compound penetrates into and fills the pores of the leather, and dries quickly after application. The shellac renders the leather water-proof, while the linseed-oil hardens the same, so that the soles are very durable, and can be worn a much longer time, as they are less affected by moisture and friction.

Having thus described my invention, I claim as new and desire to secure by Letters Patent—

A compound for preserving the soles of boots and shoes, which consists of twenty-five parts of shellac, and twenty-five parts of alcohol, mixed with fifty parts of boiled linseed-oil.

In testimony that I claim the foregoing as my invention I have signed my name in presence of two subscribing witnesses.

MAX SCHÜTZ.

Witnesses:
PAUL GOEPEL,
J. HERRMANN.